(12) United States Patent
Gieras et al.

(10) Patent No.: US 9,837,196 B2
(45) Date of Patent: Dec. 5, 2017

(54) PENDULUM-TYPE ELECTROMAGNETIC ACTUATOR

(71) Applicant: Hamilton Sunstrand Corporation, Windsor Locks, CT (US)

(72) Inventors: Jacek F. Gieras, Glastonbury, CT (US); Lubomir A. Ribarov, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/854,479

(22) Filed: Sep. 15, 2015

(65) Prior Publication Data

US 2017/0076847 A1 Mar. 16, 2017

(51) Int. Cl.
| | | |
|---|---|---|
| *H01F 7/00* | (2006.01) | |
| *H01F 7/08* | (2006.01) | |
| *H01F 7/14* | (2006.01) | |
| *H01F 41/02* | (2006.01) | |
| *F03G 3/06* | (2006.01) | |
| *H01F 7/122* | (2006.01) | |

(Continued)

(52) U.S. Cl.
CPC ............. *H01F 7/081* (2013.01); *F03G 3/06* (2013.01); *F15B 9/07* (2013.01); *F15B 13/0438* (2013.01); *H01F 7/122* (2013.01); *H01F 7/14* (2013.01); *H01F 41/02* (2013.01); *H02K 33/16* (2013.01); *H02K 41/0358* (2013.01); *H01F 2007/086* (2013.01)

(58) Field of Classification Search
CPC ............. H01F 7/081; H01F 7/14; H01F 41/02
See application file for complete search history.

(56) References Cited

U.S. PATENT DOCUMENTS

| | | |
|---|---|---|
| 4,195,277 A | 3/1980 | Leicht |
| 4,306,206 A | 12/1981 | Myers |

(Continued)

FOREIGN PATENT DOCUMENTS

| | | |
|---|---|---|
| JP | H02193130 | 7/1990 |
| JP | 2011229309 | 11/2011 |

OTHER PUBLICATIONS

European Search Report, European Application No./Patent No. 16188928.2-1556, dated Feb. 8, 2017, European Patent Office; European Search Report 13 pages.

*Primary Examiner* — Bernard Rojas
(74) *Attorney, Agent, or Firm* — Cantor Colburn LLP

(57) ABSTRACT

A pendulum-type electromagnetic actuator is provided. The actuator includes a curved stationary member comprising a stationary core and a winding wound about the stationary core. A first moving member includes a first moving core and a first plurality of permanent magnets attached to the first moving core, the first moving member is curved and positioned on a first side of the stationary member. A second moving member includes a second moving core and a second plurality of permanent magnets attached to the second moving core, the second moving member is curved and position on a second side of the stationary member, the second side opposite the first side. The actuator further includes a pivot and a pivot connector connecting at least one of the first moving member and the second moving member to the pivot such that the curved moving member rotates about the pivot.

20 Claims, 7 Drawing Sheets

(51) Int. Cl.
*H02K 41/035* (2006.01)
*F15B 9/07* (2006.01)
*F15B 13/043* (2006.01)
*H02K 33/16* (2006.01)

(56) References Cited

U.S. PATENT DOCUMENTS

| | | | |
|---|---|---|---|
| 5,041,935 | A | 8/1991 | Aruga et al. |
| 5,175,459 | A * | 12/1992 | Danial .................. H02K 7/063 310/268 |
| 5,337,030 | A | 8/1994 | Mohler |
| 7,898,121 | B2 | 3/2011 | Ramsay et al. |
| 8,242,643 | B2 * | 8/2012 | Takahashi ............. H02K 33/12 310/36 |
| 8,581,682 | B2 | 11/2013 | Patino et al. |
| 8,660,273 | B2 | 2/2014 | Wang |
| 8,746,280 | B2 | 6/2014 | Hoffmann |
| 2006/0138879 | A1 | 6/2006 | Kusase et al. |
| 2011/0037333 | A1 * | 2/2011 | Atallah .................. H02K 51/00 310/98 |
| 2012/0161568 | A1 * | 6/2012 | Umemoto ............. H02K 55/04 310/198 |
| 2013/0334900 | A1 * | 12/2013 | Stadnik ................ H02K 41/031 310/12.18 |
| 2014/0216245 | A1 * | 8/2014 | Veilleux, Jr. ........ F15B 13/0426 92/172 |

* cited by examiner

PENDULUM-TYPE ELECTROMAGNETIC ACTUATOR

BACKGROUND

The subject matter disclosed herein generally relates to electromagnetic actuators.

An electromagnetic actuator may be configured as a short-stroke electromechanical energy conversion device which converts electrical energy directly into mechanical energy. Such mechanical energy may include linear or rotational motion. An electromagnetic actuator may include moving parts that include permanent magnets (PMs) and/or a ferromagnetic member.

Short-stroke electromagnetic actuators may be used to provide and/or generate oscillatory motion. Such short-stroke actuators have found multiple applications as short stroke linear motors, compressors, pumps, valves, etc. In aerospace applications, electromagnetic actuators with oscillatory motion can be used for valves, e.g., for fuel control, pumps, refrigeration systems, etc.

SUMMARY

According to one embodiment, a pendulum-type electromagnetic actuator is provided. The actuator includes a curved stationary member comprising a stationary core and a winding wound about the stationary core. A first moving member includes a first moving core and a first plurality of permanent magnets attached to the first moving core, the first moving member is curved and positioned on a first side of the stationary member. A second moving member includes a second moving core and a second plurality of permanent magnets attached to the second moving core, the second moving member is curved and position on a second side of the stationary member, the second side opposite the first side. The actuator further includes a pivot and a pivot connector connecting at least one of the first moving member and the second moving member to the pivot such that the curved moving member rotates about the pivot.

Technical effects of embodiments of the present disclosure include an improved electromagnetic actuator that is a pendulum-type actuator. Further technical effects include electromagnetic actuators that may provide high force/torque density and have low power losses along with convection cooling and not clogging.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
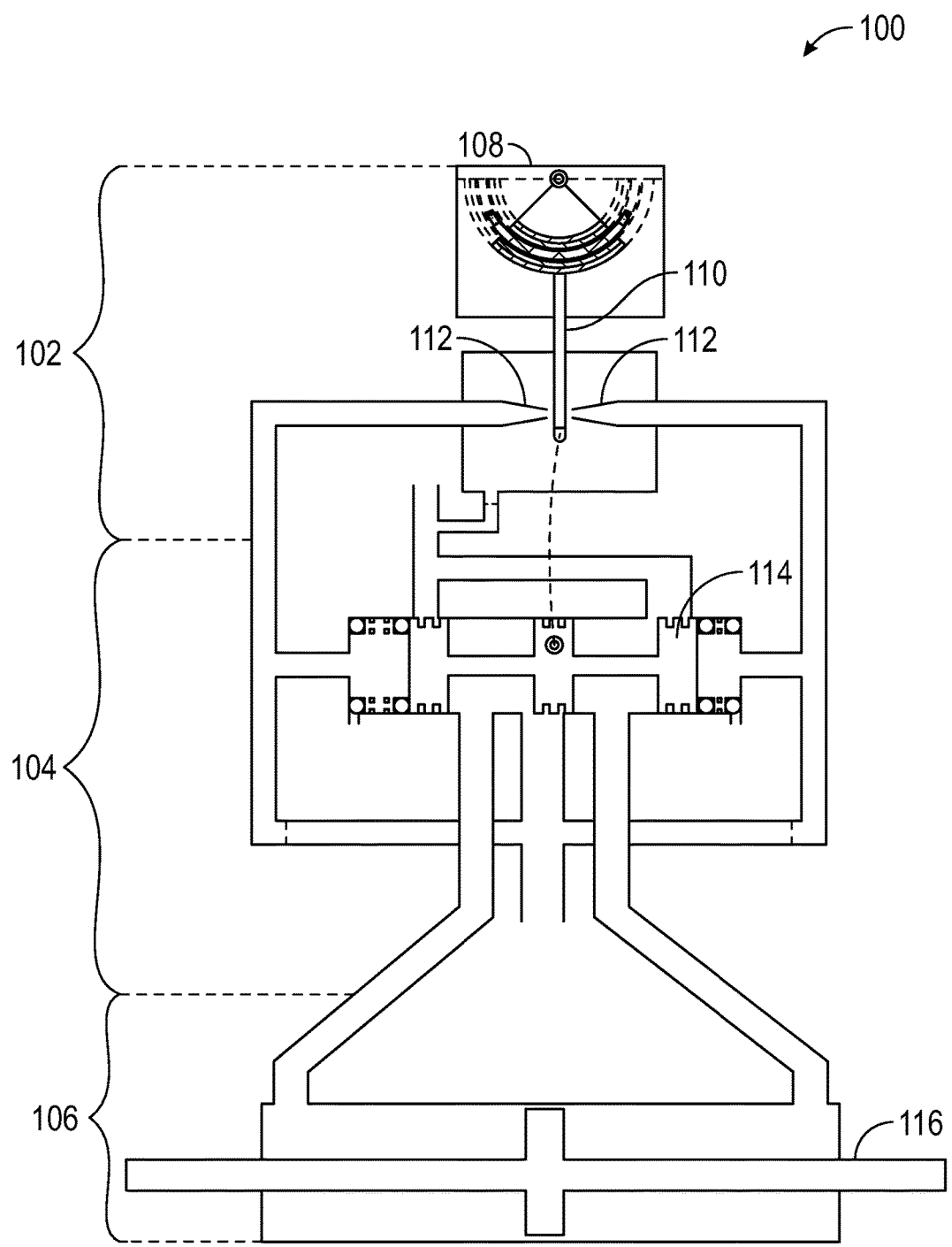
FIG. 1 is a schematic illustration of a flapper nozzle servo valve incorporating an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

As disclosed herein, in accordance with some embodiments, a type of arc-shaped, short-stroke, pendulum-type actuator is presented. The pendulum-type actuator in accordance with some embodiments disclosed herein may find broad applications in aerospace technology, e.g., servo control valves (e.g., flapper nozzle servo valves, jet pipe servo valves, etc.) used in aircraft systems, including for example fuel, oil, hydraulic, pneumatic, and motor systems. Further, as will be appreciated by those of skill in the art, actuators as described herein may be employed in various technology areas and/or applications outside of aircraft systems.

FIG. 1 is a schematic illustration of a pendulum-type electromagnetic actuator as applied to a flapper nozzle servo valve. Although described herein with respect to a flapper nozzle servo valve, those of skill in the art will appreciate that embodiments of the pendulum-type electromagnetic actuator as described herein may be employed in various configurations and/or within various mechanism and devices, without departing from the scope of the disclosure. Thus, FIG. 1 and the description thereof are presented merely for illustrative purposes.

In FIG. 1, the flapper nozzle servo valve 100 includes a flapper stage 102, a servo stage 104, and an actuator stage 106. The flapper stage 102 may include an actuator 108, a flapper 110, and one or more nozzles 112. The flapper 110 may be operably connected to a movable portion of the actuator 108. In operation, current may be applied to the actuator 108 causing the moveable portion thereof to move or oscillate. As the movable portion of the actuator 108 moves, the flapper 110 moves therewith. Movement of the flapper 110 may cause the pressure at the nozzles 112 to change, thus causing part of the servo stage 104 to operate.

For example, the servo state 104 may include a servo (e.g., spool valve) 114. The servo 114 may be configured to move linearly, e.g., left and right in FIG. 1, based on pressure differentials on either end and/or within portions of the servo 114. The servo 114 may be biased as will be appreciated by those of skill in the art. Movement of the servo 114 may cause the actuator stage 106 to operate. For example, the servo 114, depending on the position and/or movement thereof, may cause a pressure differential about a piston 116 in the actuator stage 106 to move, e.g., linearly.

Figure 2:
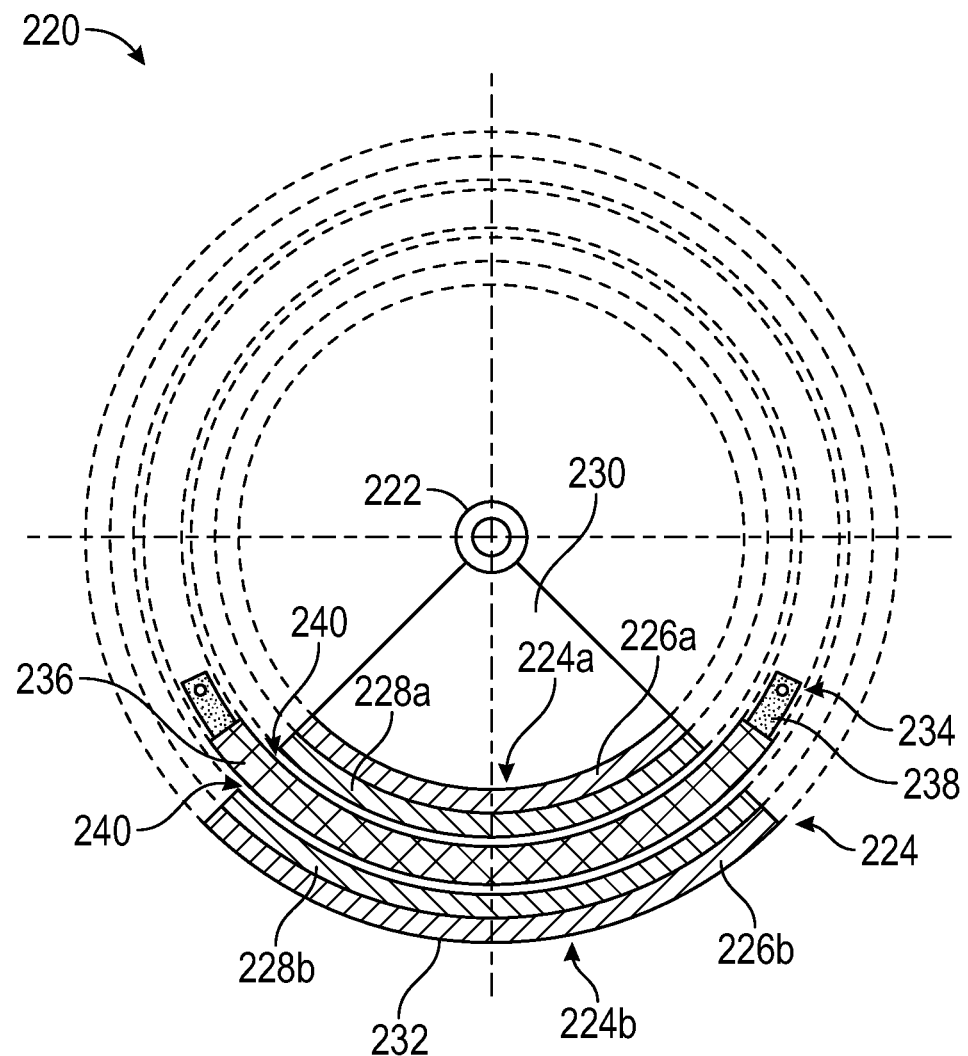
FIG. 2 is a schematic illustration of a pendulum-type actuator in accordance with an embodiment of the present disclosure.

Turning now to FIG. 2, a schematic illustration of a pendulum-type actuator in accordance with an embodiment of the present disclosure is shown. As shown, a pendulum-type actuator 220 includes a pivot 222 around which components of the pendulum-type actuator 220 may rotate. Connected to the pivot 222 may be one or more moving members 224, e.g., first moving member 224a and second moving member 224b (collectively moving member 224). The moving members 224a, 224b may each include a moving cores 226a, 226b and permanent magnets 228a, 228b, respectively. In a non-limiting embodiment, the moving members 224a, 224b may form a hollow, cylindrical structure that is operationally connected to the pivot 222 by a pivot connector 230. As shown, the permanent magnets 228a, 228b may be positioned on an interior side of the cylinder of the moving members 224a, 224b and the moving core 226a, 226b may form an exterior of the cylinder of the respective moving members 224a, 224b. The pivot connector 230 may be configured as a solid connector, rigid arms, a single connector sheet, or take any other shape or configuration that connects the moving members 224a, 224b to the pivot 222. In some embodiments, the moving members 224a, 224b may be formed from two separate elements each having permanent magnets 228a, 228b attached to a respective moving core 226a, 226b. The two moving members 224a, 224b may then be connected by a connector such as a bracket, a brace, or other connecting mechanism (e.g., see FIG. 3B). An exterior surface 232 of the second moving member 224b may be configured having a support surface and/or attachment surface or mechanism such that a flapper, e.g., as shown in FIG. 1, may be connected thereto. That is, the exterior surface 232 of the second moving member 224b may be configured to operationally connect to another device to provide movement, oscillation, and/or actuation to the other device, e.g., a flapper of a flapper nozzle servo valve.

Between the first moving member 224a and the second moving member 224b, and surrounded at least partially by the permanent magnets 228a, 228b of the moving members 224, may be a stationary member 234. The stationary member 234 may include a winding 236, such as an armature winding, wound around a stationary core 238. In some non-limiting embodiments the stationary core 238 may be configured as an armature ferromagnetic core, and in other non-limiting embodiments the stationary core may be configured as a support structure, ferromagnetic or non-ferromagnetic.

In one non-limiting embodiment, with reference to FIG. 2, an arc-shaped stationary member 232 is placed between two arc-shaped rows moving members 224a, 224b. Air gaps 240 are formed between the permanent magnets 228a, 228b of the moving members 224a, 224b and the winding 236 of the stationary member 232. In the example embodiment of FIG. 2, the permanent magnets 228a, 228b together with moving cores 226a, 226b constitute mechanically one part that can move around or rotate about the pivot 222 within an angle of 360° or less. In some non-limiting embodiments, the angle of rotation of the moving members 224a, 224b about the pivot 222 may be less than 180°, and in some embodiments may be defined by the circumferential extent, or length, of the stationary member 234. For example, if the stationary member 234 extends 360°, then the moving member 224 may move a full 360° about the pivot 222, and when the stationary part 232 extends for less than 360°, the moving part 224 may pivot only for the same angular extent. If the actuator is configured to rotate a full 360°, the actuator may be employed as a motor. In some embodiments, the stationary core 238 may be made of ferromagnetic or non-ferromagnetic materials.

Although not shown, those of skill in the art will appreciate that actuators, such as shown in FIG. 2, may include springs, cams, levers, brackets, housing, and other mechanical parts necessary for proper operation. These parts have not been shown for ease of discussion and illustration.

Figure 3A:
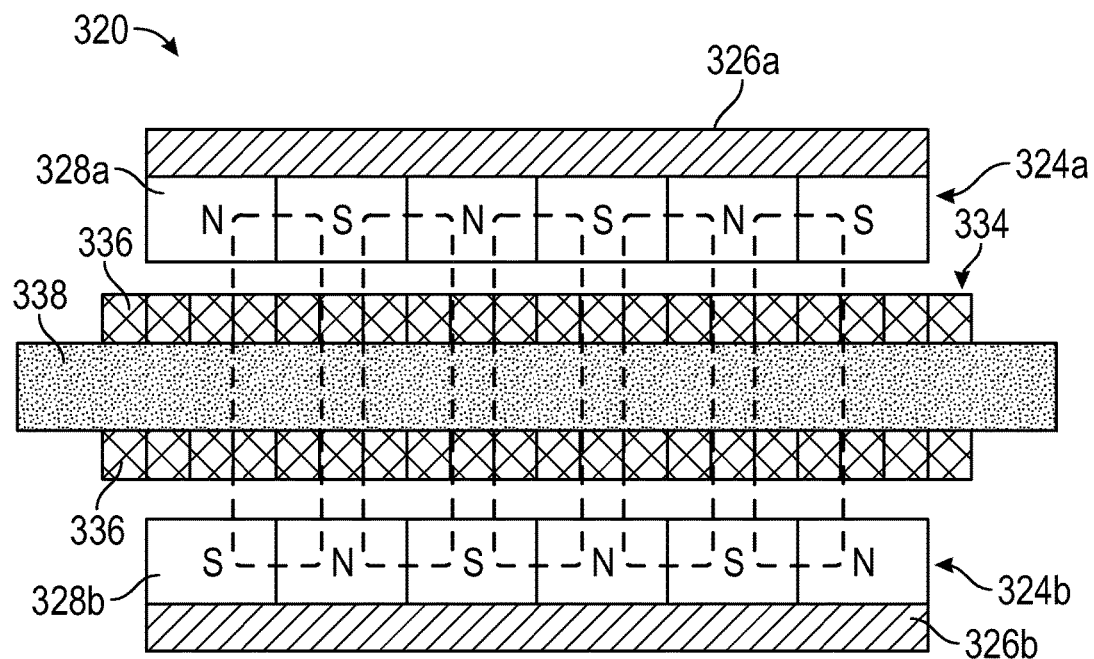
FIG. 3A is a top-down cut-away schematic illustration of a portion of an actuator in accordance with an embodiment of the present disclosure.
Figure 3B:
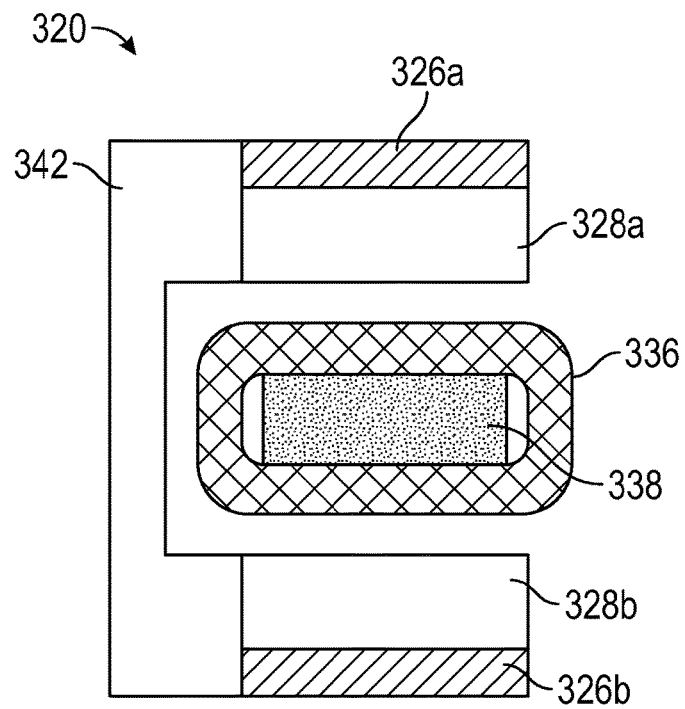
FIG. 3B is an end-on schematic illustration of the portion of the actuator shown in FIG. 3A.

Turning now to FIGS. 3A and 3B, one example configuration of permanent magnets about a non-ferromagnetic core in accordance with an embodiment is shown. FIG. 3A is a top-down cut-away view of a portion of an actuator 320 and FIG. 3B is an end-on view of the portion of actuator 320 shown in FIG. 3A. Although shown as a linear or straight actuator 320, those of skill in the art will appreciate that the actuator 320 may be curved such as that shown in FIG. 2.

As shown, a moving member 324, e.g., similar to moving member 224 of FIG. 2, may be formed from two separate moving members 324a, 324b, each moving member 324a, 324b having a respective moving core 326a, 326b and permanent magnets 328a, 328b. As shown in FIG. 3B, the two moving members 324a, 324b may be attached or connected by a connector 342. It will be appreciated by those of skill in the art that the connector 342 may take any number of configurations. Moreover, two connectors 342 attached on either side of the moving members 324a, 324b may be employed without departing from the scope of the present disclosure. As shown, the permanent magnets 328a, 328b may be configured having alternating patterns. For example, e.g., N-S-N-S . . . , as shown, a first moving member 324a have a N-S-N-S pattern and a second moving member 324b may have an opposite alternating pattern of S-N-S-N.

Between the two moving members 324a, 324b may be the stationary member 334. The stationary member 334 may be formed of a winding 336 wrapped about a curved stationary core 338. In the embodiment of FIGS. 3A and 3B, the stationary core 338 may be a non-ferromagnetic armature core with the winding 336 formed of rectangular or square-shaped conductors. The resulting magnetic flux is indicated by the dashed lines in FIG. 3A. As shown, the magnetic flux extends from the first moving member 324a, penetrates through the stationary member 334, and passes through the permanent magnets 328b of the second moving member 324b.

Figure 4A:
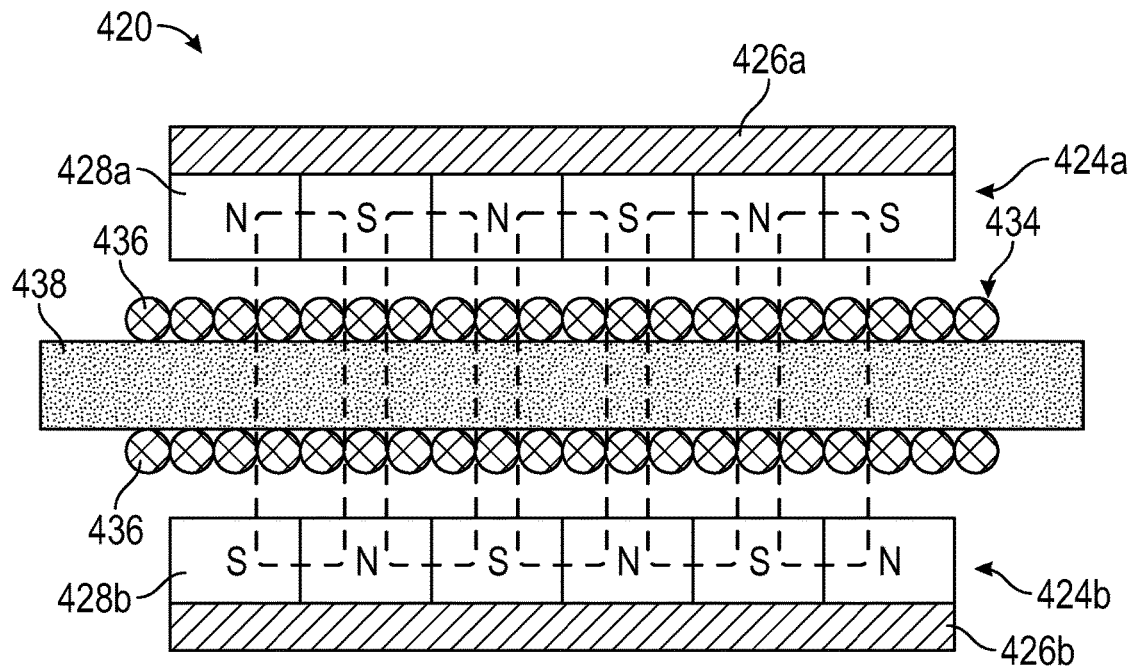
FIG. 4A is a top-down cut-away schematic illustration of a portion of an actuator in accordance with an embodiment of the present disclosure.
Figure 4B:
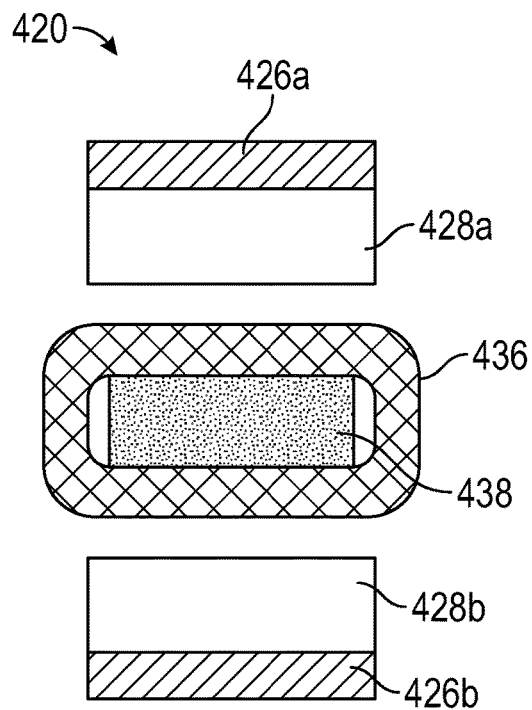
FIG. 4B is an end-on schematic illustration of the portion of the actuator shown in FIG. 4A.

Turning now to FIGS. 4A and 4B, another example configuration of permanent magnets about a non-ferromagnetic core in accordance with an embodiment is shown. FIG. 4A is a top-down cut-away view of a portion of an actuator 420 and FIG. 4B is an end-on view of the portion of the actuator 420 shown in FIG. 4A. As shown, a moving member 424, e.g., similar to moving member 224 of FIG. 2, may be formed from two separate moving members 424a, 424b, each moving member 424a, 424b having a respective moving core 426a, 426b and permanent magnets 428a, 428b. As shown, the permanent magnets 428a, 428b may have a similar configuration as that shown in FIG. 3A.

Between the two moving members 424a, 424b may be the stationary member 434. The stationary member 434 may be formed of a winding 436 wrapped about a curved stationary core 438. In the embodiment of FIGS. 4A and 4B, the stationary core 438 may be a non-ferromagnetic armature core with the winding 436 formed of circular or round-shaped conductors. The resulting magnetic flux is indicated by the dashed lines in FIG. 4A. As shown, the magnetic flux extends from the first moving member 424a, penetrates through the stationary member 434, and passes through the opposing permanent magnets 428b of the second moving member 424b.

Figure 5A:
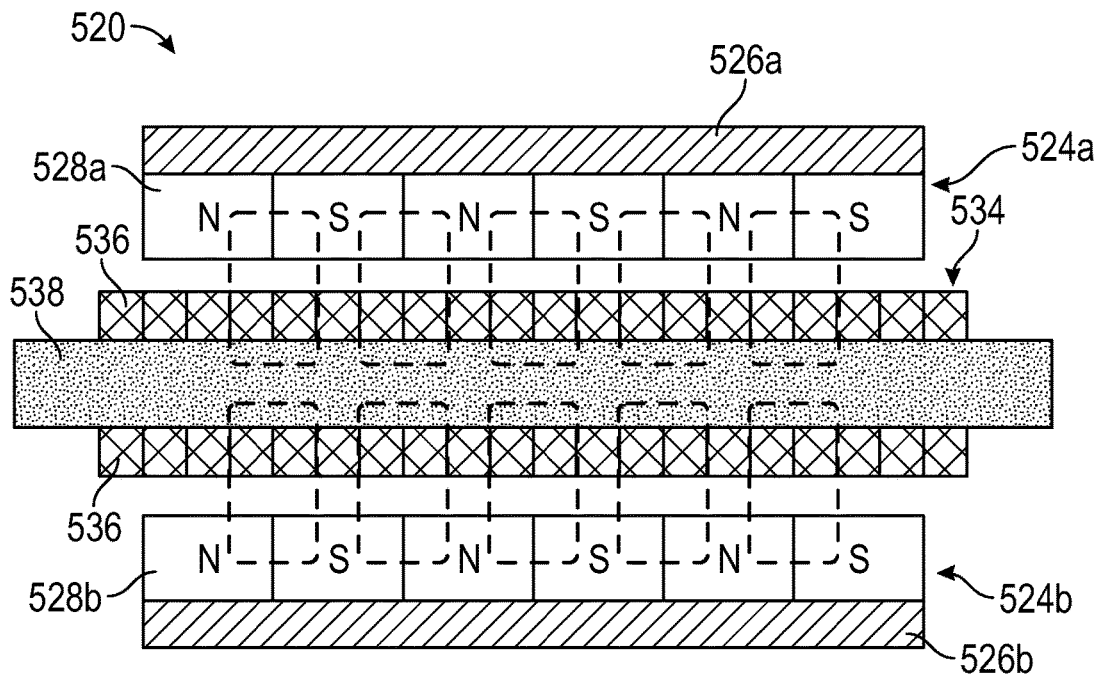
FIG. 5A is a top-down cut-away schematic illustration of a portion of an actuator in accordance with an embodiment of the present disclosure.
Figure 5B:
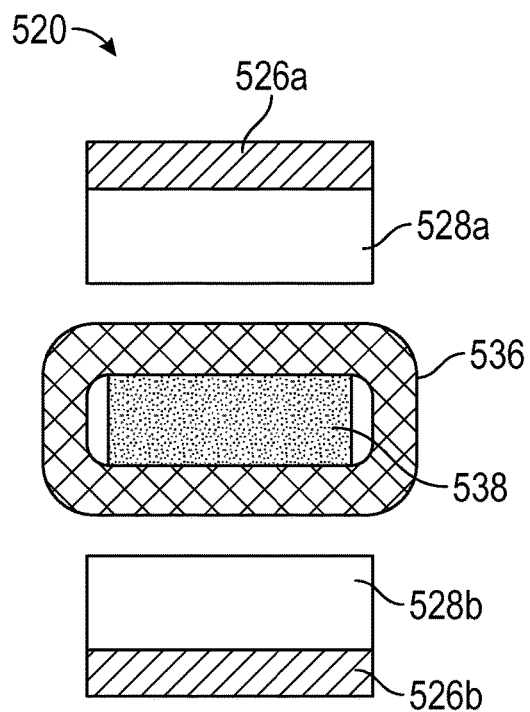
FIG. 5B is an end-on schematic illustration of the portion of the actuator shown in FIG. 5A.

Turning now to FIGS. 5A and 5B, an example configuration of permanent magnets about a ferromagnetic core in accordance with an embodiment is shown. FIG. 5A is a top-down cut-away view of a portion of an actuator 520 and FIG. 5B is an end-on view of the portion of actuator 520 shown in FIG. 5A. As shown, a moving member 524, e.g., similar to moving member 224 of FIG. 2, may be formed from two separate moving members 524a, 524b, each moving member 524a, 524b having a respective moving core 526a, 526b and permanent magnets 528a, 528b. As shown, the permanent magnets 528a, 528b may have a similar configuration as that shown in FIG. 3A.

Between the two moving members 524a, 524b may be the stationary member 534. The stationary member 534 may be formed of a winding 536 wrapped about a curved stationary core 538. In the embodiment of FIGS. 5A and 5B, the stationary core 538 may be a ferromagnetic armature core with the winding 536 formed of rectangular or square-shaped conductors. The resulting magnetic flux is indicated by the dashed lines in FIG. 5A. As shown, the magnetic flux does not extend from the first moving member 524a to the second moving member 524b, but rather each moving member 524a, 524b forms a separate magnetic flux that does not penetrate through stationary member 534.

Figure 6A:
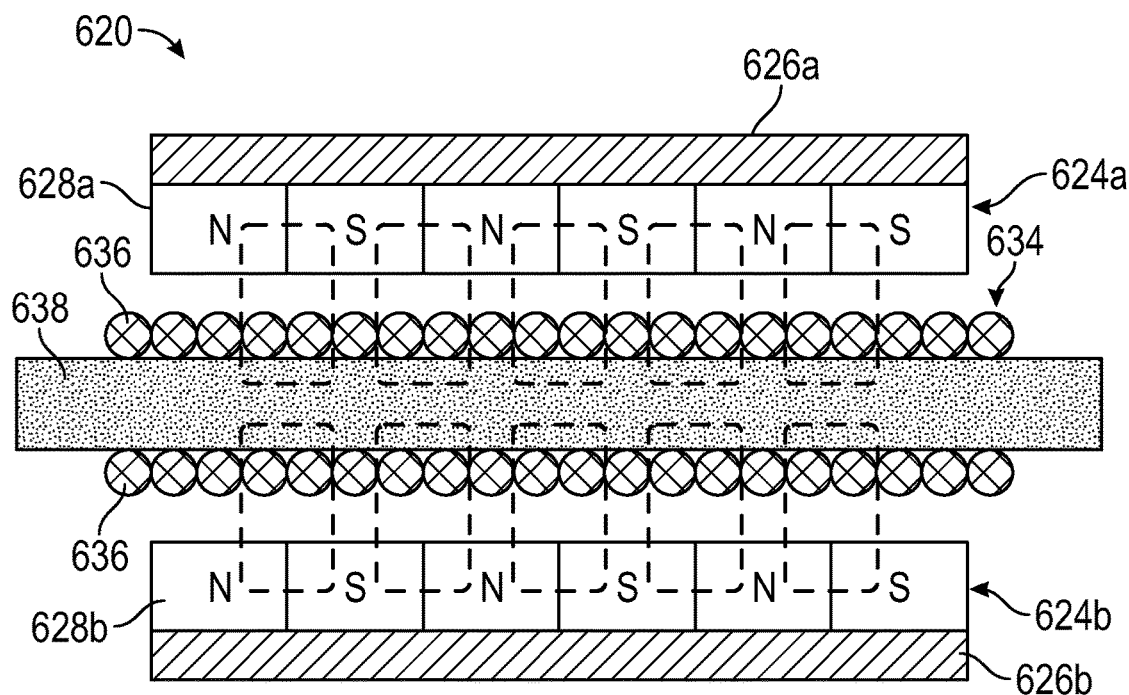
FIG. 6A is a top-down cut-away schematic illustration of a portion of an actuator in accordance with an embodiment of the present disclosure.
Figure 6B:
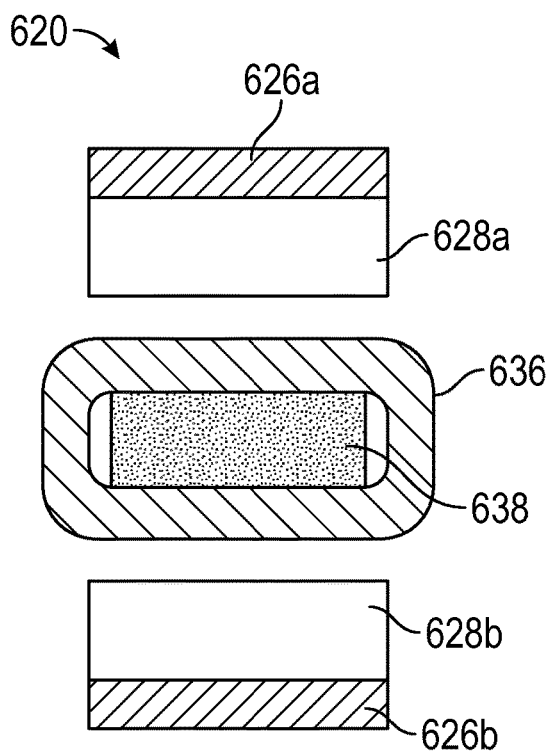
FIG. 6B is an end-on schematic illustration of the portion of the actuator shown in FIG. 6A.

Turning now to FIGS. 6A and 6B, another example configuration of permanent magnets about a ferromagnetic core in accordance with an embodiment is shown. FIG. 6A is a top-down cut-away view of a portion of an actuator 620 and FIG. 6B is an end-on view of the portion of actuator 620 shown in FIG. 6A. As shown, a moving member 624, e.g., similar to moving member 224 of FIG. 2, may be formed from two separate moving members 624a, 624b, each moving member 624a, 624b having a respective moving core 626a, 626b and permanent magnets 628a, 628b. As shown, the permanent magnets 628a, 628b may have a similar configuration as that shown in FIG. 3A.

Between the two moving members 624a, 624b may be the stationary member 634. The stationary member 634 may be formed of a winding 636 wrapped about a curved stationary core 638. In the embodiment of FIGS. 6A and 6B, the stationary core 638 may be a ferromagnetic armature core with the winding 636 formed of circular or round-shaped conductors. The resulting magnetic flux is indicated by the dashed lines in FIG. 6A. As shown, the magnetic flux does not extend from the first moving member 624a to the second moving member 624b, but rather each moving member 624 forms a separate magnetic flux that does not penetrate through stationary member 634.

Figure 7A:
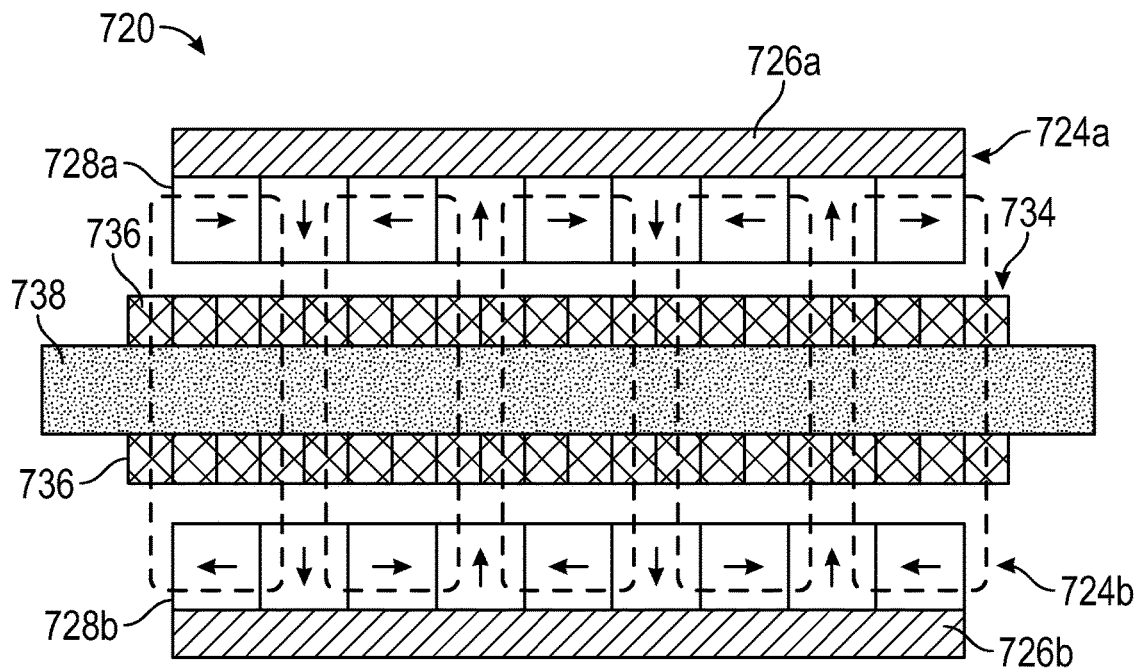
FIG. 7A is a top-down cut-away schematic illustration of a portion of an actuator in accordance with an embodiment of the present disclosure.
Figure 7B:
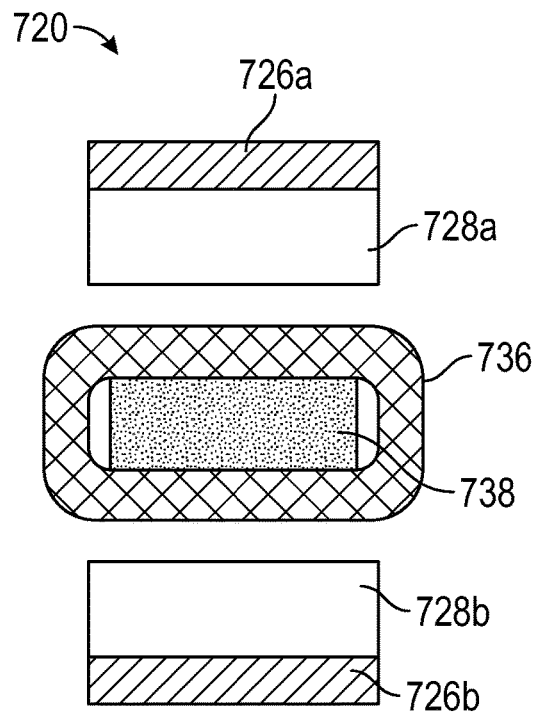
FIG. 7B is an end-on schematic illustration of the portion of the actuator shown in FIG. 7A.

Turning now to FIGS. 7A and 7B, another example configuration of permanent magnets about a non-ferromagnetic core in accordance with an embodiment is shown. FIG. 7A is a top-down cut-away view of a portion of an actuator 720 and FIG. 7B is an end-on view of the portion of actuator 720 shown in FIG. 7A. As shown, a moving member 724, e.g., similar to moving member 224 of FIG. 2, may be formed from two separate moving members 724a, 724b, each moving member 724a, 724b having a respective moving core 726a, 726b and permanent magnets 728a, 728b. As shown, the permanent magnets 728a, 728b may be configured as a Halbach array of permanent magnets. The arrows indicate the magnetization vector of individual permanent magnets of the Halbach array, with the vectors rotating along the length of the respective moving member 724a, 724b. As shown, the vector rotates from tangential to radial through a 360° pattern which is indicated by the arrows labeled on the permanent magnet elements 728a, 728b.

Between the two moving members 724a, 724b may be the stationary member 734. The stationary member 734 may be formed of a winding 736 wrapped about a curved stationary core 738. In the embodiment of FIGS. 7A and 7B, the stationary core 738 may be a non-ferromagnetic armature core with the winding 736 formed of rectangular or square-shaped conductors. The resulting magnetic flux is indicated by the dashed lines in FIG. 7A. As shown, the magnetic flux extends from the first moving member 724a, penetrates through the stationary member 734, and passes through the opposing permanent magnets 728a of the second moving member 724a. Although not shown, those of skill in the art will appreciate that other configurations with a Halbach array may be employed without departing from the scope of the present disclosure, for example, a ferromagnetic core may be used and/or the conductors may take other configurations.

As shown and described above, the winding may be made either of stiff coils (e.g., solid rectangular conductors), round conductors, or other types of conductors or windings. In accordance with a non-limiting example, in operation, the winding may be fed with a DC pulse current. A solid state converter for DC actuators may be a simple converter, such as a chopper. In other embodiments, the winding may be configured as a three-phase winding and fed with a three-phase AC current. In some such embodiments, the winding may be divided or partitioned into a plurality of coils and the sequence of coils may be configured as A, –B, C, –A, B, –C, A . . . , as will be appreciated by those of skill in the art. A three-phase, pendulum-type actuator, as described herein, may be employed for applications that may require high force. In some embodiments, a three-phase actuator as described herein may require an adequately controlled solid state inverter, e.g., a pulse width modulation inverter. The developed force generated by the actuator may depend on the current in the winding and the magnetic flux density in the air gap between the permanent magnets of the moving member and a surface of the stationary member. As will be appreciated by those of skill in the art, various configurations may include appropriate AC or DC sources electrically connected to the winding to supply the associated AC or DC currents.

In accordance with some embodiments, a Halbach array of permanent magnets may be employed in applications where miniaturization or good dynamic performance may be required. That is, a Halbach array allows for a high magnetic flux density in the air gap and does not need external return ferromagnetic paths (e.g., within the moving core) for the magnetic flux. Accordingly, in some embodiments, the moving core may be made of aluminum, other lightweight non-ferromagnetic metals, plastic, or other materials. In the case of the moving core made of metal, it may be advantageous to laminate the core in order to reduce eddy current losses.

Advantageously, embodiments described herein provide an electromagnetic actuator that is configured as a pendulum-type actuator. Advantageously, such pendulum-type actuators may provide high force/torque density. Further, advantageously, with embodiments described herein, power losses may be on the order of Joule's losses dissipated in the armature winding, which, in the case of DC current excitation are equal to the power consumption. Further, advantageously, eddy current losses in the armature ferromagnetic core due to movement of the moving member may be negligible. As a result of the low power losses, enabled by embodiments described herein, only a low temperature rise of the winding may be generated, and thus, in accordance with some embodiments, a pendulum-type electromagnetic actuator may be cooled by natural convection.

Furthermore, advantageously, embodiments described herein may have no clogging (for pneumatic actuator applications) due to objects and/or particles as no servo air is necessary to move the actuator. Furthermore, advantageously, embodiments described herein may provide a high reliability due to only one moving part (i.e., no winding on the moving part, no brush contact, etc.) and only a stationary armature winding is fed with electric current.

Moreover, advantageously, embodiments described herein may be applied to a wide range of applications, including but not limited to: electromagnetic valves for aerospace applications, pumps, compressors, sticks or joysticks (including controls on flight decks), and medical/clinical engineering. Further, for example, embodiments described herein may be employed for flight control surfaces (e.g., with three-phase winding). Further, for example, embodiments described herein may be applied to nose-wheel landing gear steering applications (e.g., with three-phase winding, high-torque actuator).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although only a single in-use application has been shown and described, those of skill in the art will appreciate that pendulum-type actuators may be used in any number of applications and/or configurations. For example, a pendulum-type actuator may be configured to replace other types of actuators, and thus the application described above is not intended to be limiting.

Accordingly, the present disclosure is not to be seen as limited by the foregoing description, but is only limited by the scope of the appended claims.

What is claimed is:

1. A pendulum-type electromagnetic actuator comprising:
a curved arc-shaped stationary member comprising a stationary core and a winding wound about the stationary core;
a first arc-shaped moving member comprising a first moving core and a first plurality of permanent magnets attached to the first moving core, the first arc-shaped moving member being curved and positioned on a first side of the arc-shaped stationary member;
a second arc-shaped moving member comprising a second moving core and a second plurality of permanent magnets attached to the second moving core, the second arc-shaped moving member being curved and positioned on a second side of the arc-shaped stationary member, the second side opposite the first side;
a pivot; and
a pivot connector connecting at least one of the first arc-shaped moving member and the second arc-shaped moving member to the pivot such that the respective moving member rotates about the pivot.

2. The actuator of claim 1, wherein the curved, arc-shaped stationary member extends in a full 360° circumference about the pivot.

3. The actuator of claim 1, wherein the curved, arc-shaped stationary member extends less than 180° about the pivot.

4. The actuator of claim 1, wherein the stationary core comprises a ferromagnetic material.

5. The actuator of claim 1, wherein the stationary core comprises a non-ferromagnetic material.

6. The actuator of claim 1, wherein the first plurality of permanent magnets and the second plurality of permanent magnets are each configured as Halbach arrays.

7. The actuator of claim 1, further comprising a connector connecting the first arc-shaped moving member and the second arc-shaped moving member.

8. The actuator of claim 7, wherein the connector comprises a bracket.

9. The actuator of claim 1, wherein the first arc-shaped moving member and the second arc-shaped moving member comprise a single part.

10. The actuator of claim 1, wherein the winding comprises round conductors wound around the stationary core.

11. The actuator of claim 1, wherein the winding comprises rectangular conductors wound around the stationary core.

12. The actuator of claim 1, wherein the second arc-shaped moving member includes an attachment surface configured to receive an element to be at least one of moved or oscillated by the first and second arc-shaped moving members.

13. The actuator of claim 12, wherein the element is one of a flapper of a flapper nozzle system and a member of a jet pipe servo valve.

14. The actuator of claim 1, further comprising a DC pulse source, wherein the winding is electrically connected to the DC pulse source to receive a DC pulse current.

15. The actuator of claim 1, further comprising a three-phase AC source, wherein the winding is electrically connected to the three-phase AC source to receive a three-phase AC current.

16. The actuator of claim 1, wherein at least one of the first moving core and the second moving core is made of one of aluminum, light-weight non-ferromagnetic metal, and plastic.

17. A method of manufacturing a pendulum-type electromagnetic actuator, the method comprising:

providing a curved, arc-shaped stationary member having a stationary core and a winding wound about the stationary core, the curved, arc-shaped stationary member positioned about a pivot;

installing a first arc-shaped moving member on a first side of the curved, arc-shaped stationary member, the first arc-shaped moving member having a first moving core and a first plurality of permanent magnets attached to the first moving core; and installing a second arc-shaped moving member on a second side of the curved, arc-shaped stationary member, the second side opposite the first side, the second arc-shaped moving member having a second moving core and a second plurality of permanent magnets attached to the second moving core, wherein the first arc-shaped moving member is connected to the pivot by a pivot connector.

18. The method of claim 17, further comprising installing an element to a surface of the second arc-shaped moving member, wherein the element is configured to be at least one of moved and oscillated by movement of the second arc-shaped moving member.

19. The method of claim 18, further comprising connecting the first moving part and the second moving part with a connector.

20. The method of claim 18, wherein the stationary core comprises one of a ferromagnetic material and a non-ferromagnetic material.

* * * * *